(12) United States Patent
Salo et al.

(10) Patent No.: US 11,146,856 B2
(45) Date of Patent: Oct. 12, 2021

(54) COMPUTER-IMPLEMENTED SYSTEM AND METHOD FOR DETERMINING ATTENTIVENESS OF USER

(71) Applicant: REALEYES OÜ, Tallinn Harju (EE)

(72) Inventors: Martin Salo, London (GB); Elnar Hajiyev, London (GB); Attila Schulc, Tallinn (EE)

(73) Assignee: REALEYES OÜ, Tallinn Harju (EE)

( * ) Notice: Subject to any disclaimer, the term of this patent is extended or adjusted under 35 U.S.C. 154(b) by 0 days.

(21) Appl. No.: 16/357,048

(22) Filed: Mar. 18, 2019

(65) Prior Publication Data
US 2019/0379938 A1 Dec. 12, 2019

(30) Foreign Application Priority Data
Jun. 7, 2018 (GB) ...................................... 1809388

(51) Int. Cl.
*H04N 21/466* (2011.01)
*G06N 20/00* (2019.01)
*H04N 21/422* (2011.01)

(52) U.S. Cl.
CPC ......... *H04N 21/4667* (2013.01); *G06N 20/00* (2019.01); *H04N 21/42201* (2013.01); *H04N 21/4666* (2013.01)

(58) Field of Classification Search
None
See application file for complete search history.

(56) References Cited

U.S. PATENT DOCUMENTS

| 8,462,996 | B2 | 6/2013 | Moon et al. | |
|---|---|---|---|---|
| 2009/0083631 | A1* | 3/2009 | Sidi | H04N 21/254 715/721 |
| 2010/0070987 | A1* | 3/2010 | Amento | H04H 60/33 725/10 |
| 2013/0046577 | A1* | 2/2013 | Marci | G06Q 10/10 705/7.29 |
| 2013/0117771 | A1* | 5/2013 | Lee | H04N 21/252 725/10 |

(Continued)

OTHER PUBLICATIONS

Phuong Pham et al: "Understanding Emotional Responses to Mobile Video Advertisements via Physiological Signal Sensing and Facial Expression Analysis", IUI 2017 Multimodal and Augmented Interaction, Mar. 13-16, 2017, Limassol, Cyprus, pp. 67-78.

*Primary Examiner* — Alexander Q Huerta
(74) *Attorney, Agent, or Firm* — Leason Ellis LLP

(57) ABSTRACT

Disclosed herein is a method and system for collecting attentiveness information associated with a user's response to consuming a piece of media content. The attentiveness information is used to create an attentiveness-labelled behavioural data for the user's response. A computer-implemented attentiveness model may be generated by applying machine learning techniques to the a set of attentiveness-labelled behavioural data from multiple users. The system may comprise an annotation tool that facilitates human labelling of the user's response with attentiveness data. The resulting attentiveness model is therefore based on correlations indicative of attentiveness within the attentiveness-labelled behavioural data and/or physiological data that are based on real human cognition rather than a predetermined feature or combination of features.

19 Claims, 5 Drawing Sheets

(56) References Cited

U.S. PATENT DOCUMENTS

| | | | |
|---|---|---|---|
| 2013/0145384 A1* | 6/2013 | Krum | G06Q 30/02 725/10 |
| 2013/0218663 A1 | 8/2013 | el Kaliouby et al. | |
| 2013/0247081 A1* | 9/2013 | Vinson | H04N 21/4532 725/14 |
| 2013/0339433 A1* | 12/2013 | Li | H04N 21/4756 709/204 |
| 2015/0112796 A1* | 4/2015 | Greenzeiger | G06Q 30/0251 705/14.49 |
| 2015/0143392 A1* | 5/2015 | Silveira-Filho | H04N 21/8133 725/10 |
| 2015/0350730 A1* | 12/2015 | el Kaliouby | A61B 5/165 725/12 |
| 2016/0198238 A1 | 7/2016 | Hajiyev et al. | |
| 2016/0241533 A1* | 8/2016 | Bist | G06F 16/901 |
| 2016/0267521 A1 | 9/2016 | Sankaran et al. | |
| 2017/0070305 A1* | 3/2017 | Bowden | H04N 7/14 |
| 2017/0139802 A1 | 5/2017 | Hajiyev et al. | |
| 2018/0007431 A1* | 1/2018 | Sidhu et al. | H04N 21/4394 |
| 2018/0295420 A1* | 10/2018 | Rumreich | H04N 21/8547 |

* cited by examiner

COMPUTER-IMPLEMENTED SYSTEM AND METHOD FOR DETERMINING ATTENTIVENESS OF USER

CROSS REFERENCE TO RELATED APPLICATIONS

This patent application claims the benefit of UK patent application no. 1809388.0 filed on 7 Jun. 2018, which is incorporated by reference herein.

FIELD OF THE INVENTION

The invention relates to a computer-implemented system and method of determining user reaction to media content. In particular, the invention relates to a computer-implemented tool for obtaining and utilising data indicative of a user's attentiveness whilst consuming media content.

BACKGROUND TO THE INVENTION

Certain types of media content, such as advertising, music videos, movies, etc., aim to induce changes in a consumer's emotional state, e.g. to catch a user's attention or otherwise increase their attentiveness. In the case of advertising, it may be desirable to translate this change in emotional state into performance, such as sales lift. For example, a television commercial may look to increase sales of a product to which it relates. There is demand for being able to evaluate the effectiveness of media content prior to publication.

Active feedback, which is also referred to as self-reported feedback, is sometimes used in attempts to determine or predict the performance of pieces of media content, such as video commercials. For active user feedback, users provide verbal or written feedback after consuming a piece of media content. For example, the users may complete a questionnaire, or may provide spoken feedback that can be recorded for analysis, e.g. manually or in an automated manner using speech recognition tools. Feedback may include an indication of emotional state experienced while consuming the piece of media content. However, active feedback from users pulls from rationalised, conscious thought processes, rather than the (passive) emotional state actually experienced. It has been shown that user preferences are outside of conscious awareness, and strongly influenced by passive emotional state. Media content performance therefore cannot be accurately predicted using active emotional state feedback.

It is known that emotional state data can also be measured in a passive manner, e.g. by collecting data indicative of a user's behavioural or physiological characteristics, e.g. while the user consumes a piece of media. In one example, facial responses can be used as passive indicators of experienced emotional state. Webcam video acquisition can be used to monitor facial responses, by capturing image frames as a piece of media content is consumed by a user. Emotional state can therefore be captured through the use of webcams, by processing video images.

Physiological parameters can also be good indicators of experienced emotional state. Many physiological parameters are not consciously controllable, i.e. a consumer has no influence over them. They can therefore be used to determine the true emotional state of a user consuming a piece of media content, which can in principle be used to accurately predict media content performance. Examples of physiological parameters that can be measured include voice analysis, heartrate, heartrate variability, electrodermal activity (which may be indicative of arousal), breathing, body temperature, electrocardiogram (ECG) signals, and electroencephalogram (EEG) signals.

It is increasingly common for users to posses wearable or portable devices capable of recording physiological parameters of the type described above. This opens up the possibility that such physiological measurements may be scalable to large sample sizes, which may enable statistical variations (noise) to be removed so that correlation with media content performance can be seen.

Emotional state information measured in this way has been shown to correlate with media content performance, and in particular sales lift. The proliferation of webcams on client devices means that capture of this type of data can be scaled to large sample sizes.

The behavioural characteristics of a user may manifest themselves in a variety of ways. References to "behavioural data" or "behavioural information" herein may refer to visual aspects of a user's response. For example, behavioural information may include facial response, head and body gestures or pose, and gaze tracking. In practice, it can be desirable to use a combination of raw data inputs comprising behavioural data, physiological data and self-reported data in order to obtain emotional state information. A combination of raw data from two or three of the sources mentioned above may be useful in identifying "false" indicators. For example, if emotional state data derived from all three sources overlaps or is aligned, it gives more confidence in the obtained signal. Any inconsistency in the signal may be indicative of a false reading.

Furthermore, some types of data may indicate only presence or absence of an emotion or attentiveness, but not the opposite. For example, a response with a variety of facial expressions may indicate high levels of attentiveness. However, the absence of changing facial expressions does not mean low levels of attentiveness. Similarly, a constantly changing head pose may indicate low levels of attentiveness, but a fixed head pose does not necessarily mean high attentiveness.

False indications may arise where behavioural characteristics are recorded for a user who is reacting to something other than the media content currently on display.

For example, the user may be distracted by another person while the media content is displayed. In that situation the behavioural characteristics of the user may be primarily influenced by their conversation with the other person, and therefore do not accurately reflect the user's response to the media content. The user's attentiveness to or engagement with the media content is therefore an important factor in determining the relevance of their collected behavioural characteristics. Moreover, attentiveness is recognized as an antecedent or gatekeeper to other mental processes. In the world of advertising, to be successfully ads must attract sufficient attention to be able to impact viewers and their memory of the ad/brand/product.

SUMMARY OF THE INVENTION

At its most general, the present invention proposes a system for collecting attentiveness information associated with a user's response to consuming a piece of media content. The attentiveness information may be used to create an attentiveness-labelled behavioural data for the user's response. A computer-implemented attentiveness model may be generated by applying machine learning techniques to the a set of attentiveness-labelled behavioural data from multiple users.

The system for collecting attentiveness information may comprise an annotation tool that facilitates manual (i.e. human-driven) labelling of the user's response with attentiveness data. The resulting attentiveness model may thus be based on correlations indicative of attentiveness within the attentiveness-labelled behavioural data and/or physiological data that are based on real human cognition rather than a predetermined feature or combination of features. It is possible to predict that certain behavioural characteristics (e.g. blink rate, head pose changes, gaze direction changes, facial expressions) will strongly correlate with attentiveness. In principle such characteristics may be used as a proxy for attentiveness. However, this approach can miss the context in which these characteristics occur, which can in turn increase the risk of false indications. By relying instead on source data that reports directly on attentiveness, the attentiveness model may avoid such problems whilst also being sensitive to more subtle correlations.

The system disclosed herein may have two aspects. In a first aspect, there is provided a data collection system that includes an annotation tool. The output from that system may be attentiveness-labelled response data, as discussed below. In a second aspect, there is provided a data analysis system that can operate using an attentiveness model obtained using the attentiveness-labelled response data in order to output information indicative of attentiveness without requiring human input. The invention may provide a computer-implemented method corresponding to each of these aspects.

Thus, in one aspect, the invention provides a computer-implemented method of determining user attentiveness during media content consumption, the method comprising: obtaining, at a collection server, response data (e.g. behavioural and/or physiological data) from a client device, wherein the response data is collected for a user consuming media content on the client device, and wherein the response data comprises a data stream representative of variation over time of the user's behaviour whilst consuming the media content; associating, at the collection server, the data stream to the media content; displaying, at an annotation device, a dynamic representation of the response data concurrently with the media content to which it is associated; receiving, at the annotation device, label data indicative of user attentiveness; and generating attentiveness-labelled response data in which the label data is associated with events in the data stream or media content.

A piece of media content may be consumable by a plurality of users, each of the plurality of users being at a respective client device. The method may comprise collecting, at each of a plurality of the respective client devices, raw input data indicative of a plurality of user responses to the piece of media content. In this manner, attentiveness-labelled response data can be obtained from a range of users, which may make it suitable for use as a training set for an attentiveness model.

The method may be usefully implemented in a networked environment, e.g. to allow for efficient use of resources. For example, each client device may be communicable with a server device over a network, wherein the processing of the collected raw input data can occur either locally or at the server device.

The term "data stream" may be used herein to indicate data that is indicative of the time evolution of one or more parameters or other response features. In other words, the data stream may comprise time-varying information. The parameters may be extracted from the information collected at the client device. This extraction may be done by the client device or some separate processing unit. In one example, the collected information comprises a video or sequence of image frames captured of the user. The collected information may be particularly useful where the video or sequence of image frames comprises facial image data of the user during consumption of the media content. A user's facial movement in response to media content may be a key indicator of attentiveness used by an annotator applying the labels. In another example the collected information may be physiological data measured at the user. Examples of physiological parameters that can be measured include voice analysis, heartrate, heartrate variability, electrodermal activity (which may be indicative of arousal), breathing, body temperature, electrocardiogram (ECG) signals, and electroencephalogram (EEG) signals.

The step of associating the data stream may comprise synchronising or otherwise mapping the collected data (e.g. visible data and/or physiological data) with or to the media content. This can be done in any known manner, e.g. by matching timing information between playback of the media content and the collected data. In one example, the response data may be time stamped, and the step of synchronising the collected data with the media content may comprise matching the time stamp data with media playback status data. The media playback status information may be transmitted from the client device, e.g. based on information from a media player which played back the media content.

The data stream may comprise a plurality of different types of response data. By providing different types of data, the data stream may facilitate annotation of attentiveness by providing the annotation with a rich picture of many aspects of the user's reaction. Moreover, following labelling for attentiveness, the different type of data may continue to provide additional response parameters and therefore provide a richer training set for a machine learning process to established an attentiveness model.

The data stream may comprise any of: emotional state data, media control data, media tag data, and media playback status data. Emotional state data may be derived or determined from captured facial images and/or physiological data using known techniques, or may be provided by the user, e.g. in the form or verbal or written feedback. Media control data may comprise information from the media player on which the media content is played back, e.g. relating to how and at what point the user interacted with the media content. For example, the media control data may include pause/resume, stop, rewind, fast forward, volume control, etc. The media tag data may be time stamped or otherwise variable information that relates to the subject matter of the media content at any given time. Herein "subject matter" may mean information about what is visible in an image or video, or an indicative of a relevant narrative arc, or the like. For example, it may include data indicative of a sentiment of the media content or the media content's audio track. The data stream may also include data indicative of a saliency of attentiveness associated with the media content. The saliency of attentiveness may be a parameter, e.g. a time-varying parameter, that relates to the likelihood of media content being attention-grabbing. For example, a portion of media content with rapidly changing scenes or dramatic audio may have a higher saliency than a more static portion. This information may be useful for providing contextual information in the attentiveness-labelled response data.

As with any of the parameters in the data stream, the media tag data may be used to filter the attentiveness-labelled response data, e.g. to provide a training set that is relevant for a particular subset of users or a particular type of media content. The media playback status data may comprise information about the quality and other relevant circumstances of how the media content was played back at the client device. For example, the media playback status may indicate when unexpected pauses or delays occur in playback of the media content, e.g. due to buffering or network problems. The media playback status information may be collected and supplied by the client device.

The step of generating the attentiveness-labelled response data may comprise adding an attentiveness label parameter to the data stream. In other words, the label data that is applied may be consolidated or otherwise processed to create a data time series for an attentiveness label parameter, which can be synchronised or aligned with the other parameters in the data stream. The label data and/or attentiveness label parameter may be a score of attentiveness, e.g. some measure that enables comparison, such as a numeric or other value-based identifier, or variation within an unbounded range, where the comparison is based on relative change rather than absolute values. In one example, the label data may be a plurality of preset levels, which may be numeric (e.g. 1, 2, 3) or have suitable identifiers (e.g. high, medium, low). There may be any number of levels, e.g. 5 or more, or 10 or more. In another example, the label data may be assigned from a sliding scale, such as a linear numeric scale (e.g. from 0 to 100). It may be understood that the invention need not be limited to any specific form of scoring rules.

In one example, attentiveness data may be obtained from multiple annotators and aggregated or otherwise combined to yield an attentiveness score for a given response. For example, attentiveness data from multiple annotators may be averaged over portions of the media content.

In one embodiment, the level of agreement between multiple annotators may itself be used as way of quantifying attentiveness. This may allow rich data to be obtained even if the annotation task itself is simply, e.g. a binary option of either (a) attentive, or (b) not attentive. In some circumstances a third option (c) unknown, may be included to facilitate annotation of portions where it is not possible to judge level of attentiveness based on data available.

The method may therefore include receiving attentiveness data from multiple annotators, and generating combined attentiveness data from the different sets of attentiveness data. The combined attentiveness data may comprise an attentiveness parameter that is indicative of level of positive correlation between the attentiveness data from the plurality of annotators. The attentiveness parameter may be a time-varying parameter, i.e. the score indicating agreement may vary across the duration of the response data to indicate increasing or decreasing correlation.

Each annotator may have a confidence value associated therewith. The confidence value may be calculated based on how well that annotator's individual scores correlate with the combined attentiveness data. The confidence values may be updated dynamically, e.g. as more data is received from each individual annotator. The confidence values may be used to weight the attentiveness data from each annotator in the process of generating the combined attentiveness data.

Where the behavioural data comprises emotional state data, the method may further comprise deriving a significance score or weighting for the emotional state data based on the received label data indicative of user attentiveness. In other words, the information about a user's attentiveness is used to affect the influence of the emotional state data for the user in future steps. Thus, if it were useful to try to determine how a piece of media content made people feel, the invention would be able to reduce the impact of emotion reactions from people who were not engaged with the media content. This may be beneficial because otherwise the emotional reactions from non-engaged users could skew the findings.

In addition to the information about the time evolution of response data parameters in the data stream, the attentiveness-labelled response data may comprise static user data. For example, the static information may be profile information about the user, e.g. gender, age, location, or any other demographic detail. The static user data may be used as a parameter in the neural network or as a filter so that attentiveness for a certain class of users can be assessed and/or weighted independently.

In practice, the application of the label data may require the response data and media content to be considered repeatedly. To assist in this, the method may include controlling the concurrently displayed dynamic representation of the response data and the media content to which it is associated. Controlling here may mean that the concurrently displayed material can be manipulated as one, e.g. by pausing, rewinding, fast-forwarding, frame stepping, or any other technique. The displayed response data may comprise any parameter mentioned with respect to the data stream above. The display data may be visual data such as facial images, and/or may be graphical representations of non-visible data, such as physiological data.

A display that combines multiple behavioural parameters may further improve the quality and speed of human annotations. It assists annotators in identifying areas in the timeline where changes in the attentiveness are likely to have happened and they can assess whether those changes are due to the media content or induced by other factors.

One important use of the attentiveness-labelled response data is in generating an attentiveness model capable of scoring user attentiveness based on collected data without human input. The method may thus further comprise: storing, in a data repository, attentiveness-labelled response data from multiple users; extracting, from the data repository by an analysis server, an attentiveness-labelled response data training set; establishing, at the analysis server, an objective for a machine learning algorithm; and generating, using the machine learning algorithm, an attentiveness model from the attentiveness-labelled response data training set. Any suitable machine learning process may be used, although an artificial neural network may be preferred.

In another example, rather than obtaining human annotations, the attentive model may instead use one or a subset of parameters in the data stream as a ground truth against which the attentiveness model can be trained. For example, where physiological data is recorded, this may be used as a target for an artificial neural network. In this example, the attentiveness model can effectively predict a physiological response (which may be indicate of attentiveness) based on collected information for users where physiological data is not available. In another example, attentiveness saliency may be used as a target for the attentiveness model.

When both physiological and human-label data are present, the two types of data can be merged for a combined overall improved measure of attentiveness, which itself can then used as a target for artificial neural network.

The method may comprise obtaining, at the collection server, new response data (e.g. behavioural data and/or physiological data) from a client device, wherein the response data is collected for another user consuming media content on the client device, and wherein the response data comprises a data stream representative of variation over time of the user's behaviour whilst consuming the media content; and inputting the new response data to the attentiveness model to obtain an attentiveness score for one or more portions of the new response data. The attentiveness model may itself divide the response into portions having different durations, e.g. corresponding to a frame or a certain sequence of frames in the media content or behavioural data (especially the facial image data). The new behavioural data may comprise facial image data of the other user during consumption of the media content.

The attentiveness model may be targeted or tailored. For example, the step of extracting the attentiveness-labelled response data training set may comprise applying a filter to the attentiveness-labelled response data in the repository. The filter may be based on user type, media type, media content, quality/reliability of a label, intensity of attentiveness, etc. The resulting attentiveness model may thus be appropriate for certain circumstance. A plurality of attentiveness models adapted for certain scenarios may be obtained from the same data repository.

As mentioned above, the attentiveness-labelled response data in the training set may comprise media tag data indicative of subject matter in the media content being consumed. The method may further comprise: obtaining new media tag data for another piece of media content, and inputting the new media tag data to the attentiveness model to obtain an attractiveness score for one or more portions of the piece of media content. In other words, the attentiveness model may have due regard to the subject matter, structure or layout of the media content. It may thus be able to predict how people will be engaged with the media content based on its subject matter and presentation. A meaningful attentiveness score may be very useful in preventing unnecessary human-based testing of the media content before launch. This may be useful in an example where attentiveness is expected at particular portions of the media, e.g. brand reveal in an advertisement, on in action-packed sequences in other media. Taking this information into account may be a way of obtaining training data more efficiently, or it may enable the attentiveness model to be targeted at particular types of event that occur in a given piece of media (e.g. brand reveal in advertising). As discussed above, this kind of attentiveness saliency information may be part of the data stream that is used to facilitate annotation, i.e. mixed with other measures of attentiveness, such as the human-labelled data and/or physiological data. A mixed data stream such as this may represent better attentiveness data for training an attentiveness model. For example, attentiveness saliency deduced from the content itself can be used to weight the human labels.

Network-based computing systems may be configured to execute the method steps outlined above. For example, in another aspect of the invention there is provided a system for determining user attentiveness during media content consumption, the system comprising: a collection server communicatively coupled via a network to a plurality of client devices, the collection server being configured to: obtain response data (e.g. behavioural data and/or physiological data) from the plurality of client devices, wherein the response data is collected for a user consuming media content on the client device, and wherein the response data comprises a data stream representative of variation over time of the user's behaviour whilst consuming the media content; and map the data stream to the media content; and an annotation device communicatively coupled to the collection server, the annotation device being configured to: display a dynamic representation of the response data concurrently with the media content to which it is associated; receive label data indicative of user attentiveness; and generate attentiveness-labelled response data in which the label data is associated with events in the data stream or media content. The annotation device may be a computer terminal displaying a graphical user interface that provides the relevant functionality. This system may be arranged to carry out any of the method steps discussed above.

In another aspect, the disclosure herein may provide a system for determining user attentiveness during media content consumption, the system comprising: a data repository storing attentiveness-labelled response data from multiple users, the attentiveness-labelled response data comprising: a data stream representative of variation over time of a user's behaviour whilst consuming a piece of media content, and label data indicative of user attentiveness associated with events in the data stream or media content; and an analysis server configured to: extract from the data repository an attentiveness-labelled response data training set; and generate, using a machine learning algorithm, an attentiveness model from the attentiveness-labelled response data training set, receive new response data, and apply the attentiveness model to the new response data to obtain an attentiveness score for one or more portions of the new response data. This aspect provides a system that can obtain the attentiveness model and apply it to new response data.

BRIEF DESCRIPTION OF THE DRAWINGS

Embodiments of the invention are discussed in detail below with reference to the accompanying drawings, in which.

DETAILED DESCRIPTION; FURTHER OPTIONS AND PREFERENCES

Figure 1:
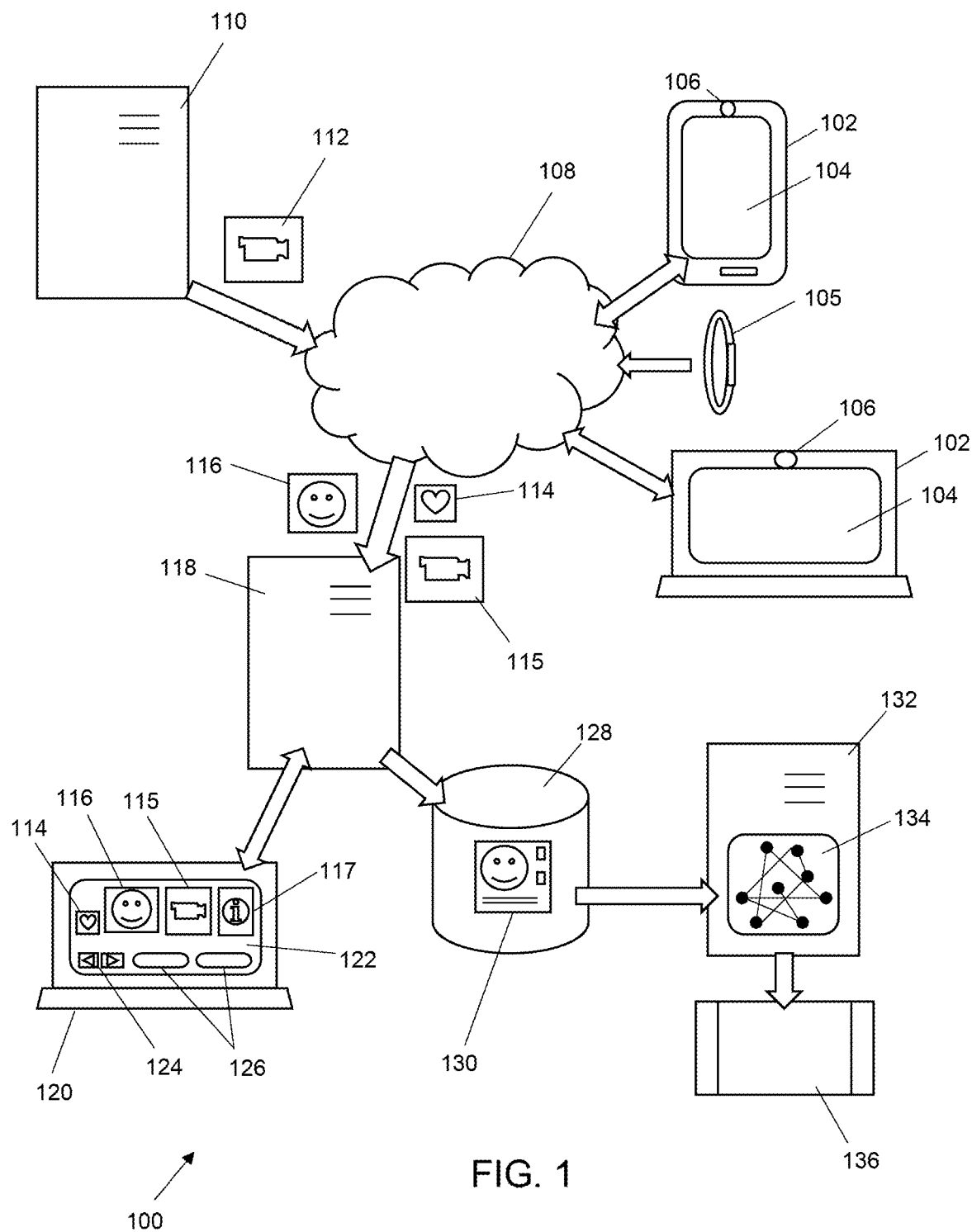
FIG. 1 is a schematic diagram of a data collection and analysis system that is an embodiment of the invention.

Embodiments of the invention relate to a system and method of collecting and utilising behavioural data from a user while the user is consuming a piece of media content. FIG. 1 is a schematic diagram of a complete data collection and analysis system 100 that is an embodiment of the invention. It can be understood that the system in FIG. 1 illustrates components for performing collection and annotation of data, as well as for subsequent use of that data in generating and utilising an attentiveness model. In other examples separate systems having these functionalities may be provided.

The system 100 is provided in a networked computing environment, where a number of processing entities are communicably connected over one or more networks. In this example, the system 100 comprises one or more client devices 102 that arranged to playback media content, e.g. via speakers or headphones and a display 104. The clients devices 102 may also comprise or be connected to behavioural data capture apparatus, such as webcams 106, microphones, etc. Example client devices 102 include smartphones, tablet computers, laptop computers, desktop computers, etc.

The system 100 may also comprise one of more client sensors units, such as a wearable device 105 for collecting physiological information from a user while they consume media content on a client device 102. Examples of physiological parameters that can be measured include voice analysis, heartrate, heartrate variability, electrodermal activity (which may be indicative of arousal), breathing, body temperature, electrocardiogram (ECG) signals, and electroencephalogram (EEG) signals.

The client devices 102 are communicably connected over a network 108, such that they may receive media content 112 to be consumed, e.g. from a content provider server 110.

The client devices 102 may further be arranged to send collected behavioural information over the network for analysis or further processing at a remote device, such as analysis server 118. As mentioned above, references to "behavioral data" or "behavioral information" herein may refer to any collected information about the user's response, e.g. visual aspects of a user's response or physiological data. For example, behavioral information may include facial response, head and body gestures or pose, and gaze tracking.

In this example, the information sent to the analysis server 118 may include a user's facial response 116, e.g. in the form or a video or set of images captured of the user while consuming the media content. The information may also include the associated media content 115 or a link or other identifier that enables the analysis server 118 to access the media content 112 that was consumed by the user. The associated media content 115 may include information concerned the manner in which the media content was played back at the client device 102. For example, the associated media content 115 may include information relating to user instructions, such a pause/resume, stop, volume control, etc. Additionally or alternatively, the associated media content 115 may include other information about delays or disruptions in the playback, e.g. due to buffering or the like. The analysis server 118 may thus effectively receive a data stream comprises information relating to a user's response to the piece of media content.

The information sent to the analysis server 118 may also include physiological data 114 obtained for the user while consuming the media content. The physiological data 114 may be transmitted directly by the wearable device 105, or the wearable device 105 may be paired with one or more client devices 102, which are arranged to receive and send on data from the wearable device 105. The client device 102 may be arranged to process raw data from the wearable device, whereby the physiological data 114 transmitted to the analysis server 118 may comprise data already processed by the client device 102.

In the present example, the purpose of collecting information about the user's response to the media content is to enable that response to be annotated with attentiveness labels. In one example, this annotation process may comprise establishing a time series of attentiveness scores that map onto a time series of one or more behavioural characteristic parameters received at the analysis server 118. For example, the time series of attentiveness scores may be associated with the images or video of the user collected while the user was consuming the media content. Other behavioural characteristic parameters, e.g. emotional state information, physiological information, etc., may be synchronised with the images or video of the user. An output of the annotation process may thus be a rich data stream representative of the user's behavioural characteristics, including attentiveness, in response to the media content.

The system 100 provides an annotation tool 120 that facilitates execution of the annotation process. The annotation tool 120 may comprise a computer terminal in communication (e.g. networked communication) with the analysis server 118. The annotation tool 120 includes a display 122 for showing a graphical user interface to a human annotator (not shown). The graphical user interface may take many forms. However, in may usefully comprise a number of functional elements. Firstly, the graphical user interface may present collected user response data 116 (e.g. the set of facial images or video showing the user's facial movements) alongside associated media content 115 in a synchronised manner. In other words, the user's facial reactions are displayed simultaneously with the associated media content that the consumer was watching. The graphical user interface may also present a suitable graphical representation of the physiological data 114. Alternatively or additionally, the graphical user interface may also present a graphical representation of attentiveness saliency 117 associated with the media content. In this manner the annotator can be aware (consciously or subconsciously) of the context in which the user's response occurred. In particular, the annotator may be able to adjudge attentiveness based on a reaction to events in the associated media content, or may be sensitive to external events that may have distracted the user.

The graphical user interface may include a controller 124 for controlling playback of the synchronised response data 116 and associated media content. For example, the controller 124 may allow the annotator to play, pause, stop, rewind, fast forward, backstep, forward step, scroll back, scroll forward or the like through the displayed material.

The graphical user interface may include one or more score applicators 126 for applying an attentiveness score to a portion or portions of the response data 116. In one example, a score applicator 126 may be used to apply an attentiveness score to a period of a video or set of image frames corresponding to a given time period of the user's response. The attentiveness score may have any suitable format. In one example it is binary, i.e. a simple yes/no indication of attentiveness. In other examples, the attentiveness score may be selected from a set number of predetermined levels (e.g. high, medium, low), or may be chosen from a numerical range (e.g. a linear scale) between end limits that represent no attention (or absence) and high attention respectively.

Simplifying the annotation tool may be desirable in terms of expanding the potential annotator pool. The simpler the annotation process, the less training is required for annotators to participate. In one example, annotated data may be harvested using a crowd-sourcing approach.

The annotation tool 120 may thus represent a device for receiving a time series of data indicative of a user's attentiveness while consuming a piece of media contact. The attentiveness data may be synchronised (e.g. by virtue of the manner in which the score is applied) with the response data 116. The analysis server 118 may be arranged to collate or otherwise combine the received data to generate attentiveness-labelled response data 130 that can be stored in a suitable storage device 128.

The attentiveness data from multiple annotators may be aggregated or otherwise combined to yield an attentiveness score for a given response. For example, attentiveness data from multiple annotators may be averaged over portions of the media content.

In one embodiment, the level of agreement between multiple annotators may itself be used as way of quantifying attentiveness. For example, the annotation tool 120 may permit each annotator with a binary option to score the response data: the user is either (a) attentive, or (b) not attentive. The annotator tool 120 may present one or more reasons fields in which an annotator can provide a reason for the binary selection. There may be a drop down list or the like of predetermined reasons from which field may be populated. The predetermined reasons may include common reasons for attention or inattention, e.g. "turning head away", "not looking at screen", "talking", etc. The field may also permit free text entry. The attentiveness data from each annotator may include the results of the binary selection for various periods within the response data, together with associated reasons. The reasons may be used to assess circumstances in which there is a high degree of disagreement between annotators, or where an attentiveness model outputs a result that does not agree with observation. This can happen, for example, where similar facial movements correspond to different behaviours (e.g. talking/eating, etc.).

The analysis server 118 may be arranged to receive the attentiveness data from multiple annotators. The analysis server 118 may generate combined attentiveness data from the different sets of attentiveness data. The combined attentiveness data may comprise an attentiveness parameter that is indicative of level of positive correlation between the attentiveness data from the plurality of annotators. In other words, the analysis server 118 may output a score that quantifies the level of agreement between the binary selections made by the plurality of annotators across the response data. The attentiveness parameter may be a time-varying parameter, i.e. the score indicating agreement may vary across the duration of the response data to indicate increasing or decreasing correlation.

In a development of this concept, the analysis server 118 may arranged to determine and store a confidence value associated with each annotator. The confidence value may be calculated based on how well the annotators individual scores correlate with the combined attentiveness data. For example, an annotator who regularly scores in the opposite direction to the annotator group when taken as a whole may be assigned a lower confidence value than an annotator who is more often in line. The confidence values may be updated dynamically, e.g. as more data is received from each individual annotator. The confidence values may be used to weight the attentiveness data from each annotator in the process of generating the combined attentiveness data. The analysis server 118 may thus exhibit the ability to 'tune' itself to more accurate scoring.

The attentiveness-labelled response data 130 may include the attentiveness parameter. In other words, the attentiveness parameter may be associated with, e.g. synchronised or otherwise mapped to or linked with, events in the data stream or media content.

The attentiveness-labelled response data 130 may include any one or more of: the original collected data 116 from the client device 102 (e.g. the raw video or image data, which is also referred to herein as the response data); the time series of attentiveness data; time series data corresponding to one or more physiological parameters from the physiological data 114; and emotional state data extracted from the collected data 116.

The collected data may be image data captured at each of the client device 102. The image data may include a plurality of image frames showing facial images of a user. Moreover, the image data may include a time series of image frames showing facial images of a user.

Where the image frames depict facial features, e.g. mouth, eyes, eyebrows etc. of a user, and each facial feature comprises a plurality of facial landmarks, the response data may include information indicative of position, shape, orientation, shading etc. of the facial landmarks for each image frame.

The image data may be processed on respective client devices 102, or may be streamed to the analysis server 118 over the network 108 for processing.

The facial features may provide descriptor data points indicative of position, shape, orientation, sharing, etc., of a selected plurality of the facial landmarks. Each facial feature descriptor data point may encode information that is indicative of a plurality of facial landmarks. Each facial feature descriptor data point may be associated with a respective frame, e.g. a respective image frame from the time series of image frames. Each facial feature descriptor data point may be a multi-dimensional data point, each component of the multi-dimensional data point being indicative of a respective facial landmark.

The emotional state information may be obtained directly from the raw data input, from the extracted descriptor data points or from a combination of the two. For example, the plurality of facial landmarks may be selected to include information capable of characterizing user emotion. In one example, the emotional state data may be determined by applying a classifier to one or more facial feature descriptor data points in one image or across a series of images. In some examples, deep learning techniques can be utilised to yield emotional state data from the raw data input.

The user emotional state may include one or more emotional states selected from anger, disgust, fear, happiness, sadness, and surprise.

The creation of the attentiveness-labelled response data represents a first function of the system 100. A second function, described below, is in the subsequent use of that data to generate and utilise an attentiveness model.

The system 100 may comprise a modelling server 132 in communication with the storage device 128 and arranged to access the attentiveness-labelled response data 130. The modelling server 132 may connect directly to the storage device 128 as shown in FIG. 1 or via a network such as network 108.

The modelling server 132 is arranged to apply machine learning techniques to a training set of attentiveness-labelled response data 130 in order to establish a model 136 for scoring attentiveness from unlabelled response data, e.g. response data 116 as originally received by the analysis server 118. The model may be established as an artificial neural network trained to recognise patterns in collected response data that are indicative of high levels of attentiveness. The model can therefore be used to automatically score collected response data, without human input, for attentiveness. An advantage of this technique is that the model is fundamentally based on direct measurements of attentiveness that are sensitive to contextual factors that may be missed by measurements or engagement or attentiveness that rely on certain predetermined proxies.

In one example, the attentiveness-labelled response data used to generate the attentiveness model may also include information about the media content. This information may relate to how the media content is manipulated by the user, e.g. paused or otherwise controlled. Additionally or alternatively, the information may include data about the subject matter of the media content on display, e.g. to give context to the collected response data.

Herein the piece of media content may be any type of user-consumable content for which information regarding user feedback is desirable. The invention may be particular useful where the media content is a commercial (e.g. video commercial or advert), where user engagement or attention is likely to be closely linked to performance, e.g. sales uplift or the like. However, the invention is applicable to any kind of content, e.g. any of a video commercial, an audio commercial, a movie trailer, a movie, a web advertisement, an animated game, an image, etc.

Figure 2:
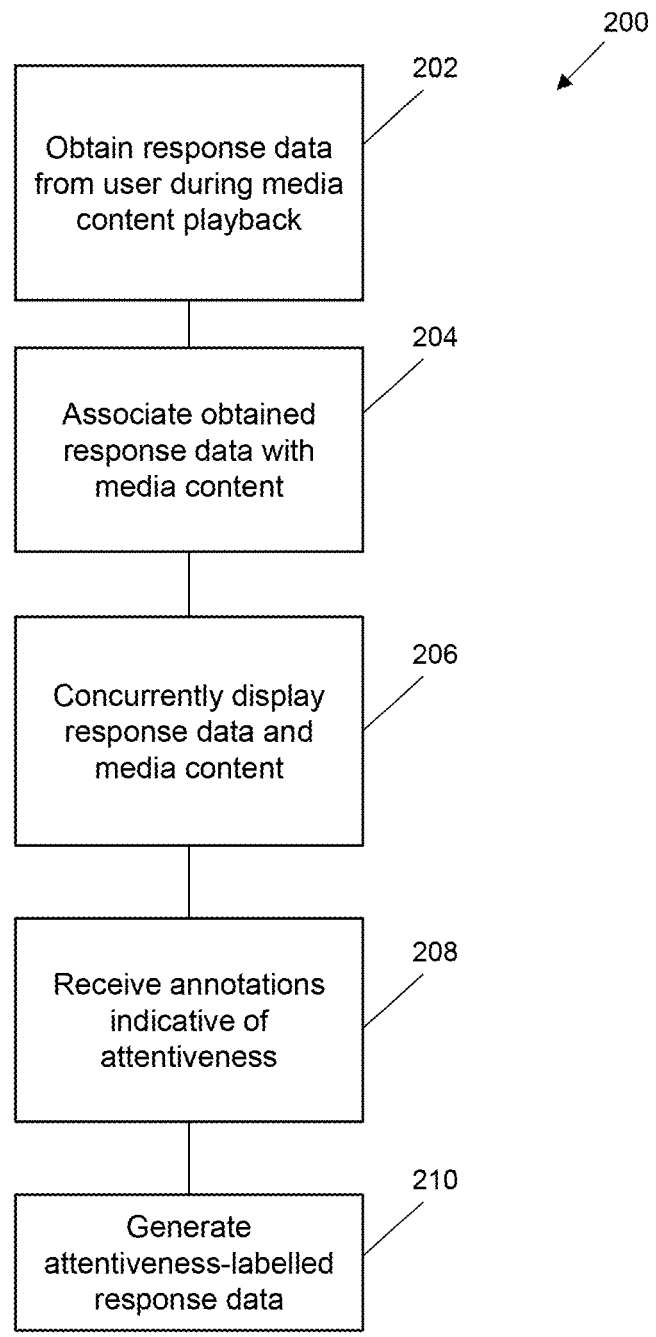
FIG. 2 is a flow diagram of a data collection method that is an embodiment of the invention.

FIG. 2 is a flow diagram of a data collection method 200 that is an embodiment of the invention. The method commences when a user initiates playback of a piece of media content on a client device. The method includes a step 202 of obtaining response data from the user while they consume the media content. As explained above, the response data may be collected from a range of device, e.g. a webcam recording facial images, a physiological sensor (e.g. in a wearable device) recording physiological data, a microphone recording audio, etc. The response data may be collected and combined by a client device, and then transmitted to an analysis device for further processing.

The method continues with a step 204 of mapping or synchronising the response data with the media content that was consumed. This may be done by the client device or analysis server, e.g. by aligning time stamps on the collected response data with known information about the playback time of the media content.

The method continues with a step 206 of concurrently displaying information indicative of the response data with the media content. In one example this may mean simultaneously displaying the recorded images of the user alongside the media content.

The method continues with a step 208 of receive annotations indicative of the level of attentiveness of the user to the media content. The annotations may be supplied by a human annotator who watches the concurrently displayed response data and media content and makes a judge about the extent to which the user is engaged with the media content.

The method continues with a step 210 of generating attentiveness-labelled response data in which the annotations indicative of attentiveness are incorporated e.g. as a separate on integrated data time series, with the response data for subsequent use. In one example, emotional state information may also be extracted from the collected response data. The attentiveness-labelled response data may thus include any or all of raw collected data, emotional state data derived therefrom, collected physiological data, attentiveness data, and data relating to the media content. The raw collected data may comprise images of the user together with other user data, e.g. demographic data, geographic data, or the like.

Figure 3:
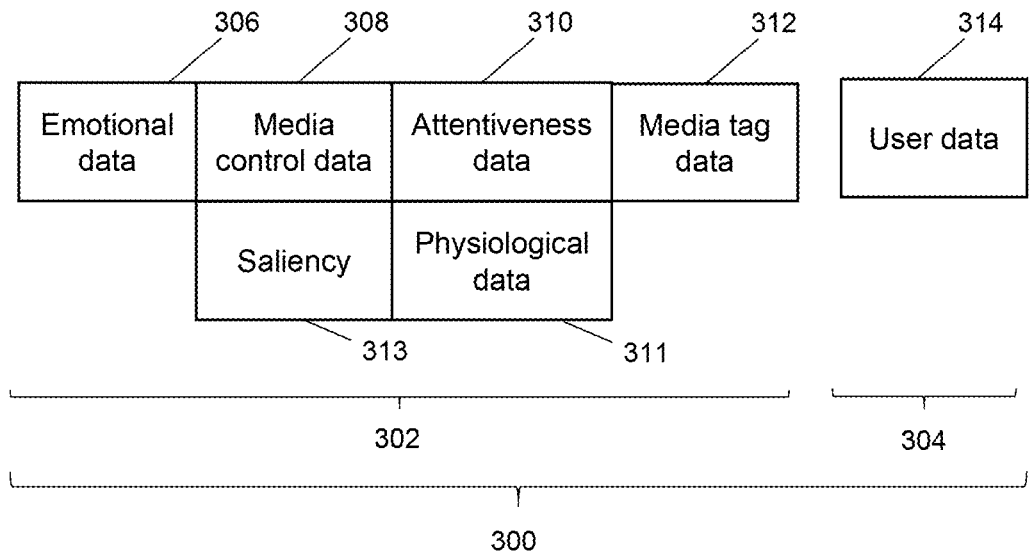
FIG. 3 is a schematic diagram showing a data structure for attentiveness-labelled response data that may be used in embodiments of the invention.

FIG. 3 is a schematic diagram showing a data structure 300 for attentiveness-labelled response data that may be used in embodiments of the invention. The data structure may comprise a set of time varying parameters 302, and a set of static data 304. In this example, the time varying parameters include emotional state data 306, media control data 308, attentiveness label data 310, physiological data 311, attentiveness saliency 313, and media tag data 312. The set of static data 304 comprises user data 314.

The media control data 308 may indicate how the user interacts with a media player on which the media content was delivered, e.g. by pausing or otherwise altering the playback conditions. The media tag data 312 may represent a series of tags that are indicative of the subject matter of the media content from time to time. In the case of video content, the tags are likely to vary between scenes in the video, and may therefore represent a high level abstraction of the content that may nevertheless correlate with user attention.

Figure 4:
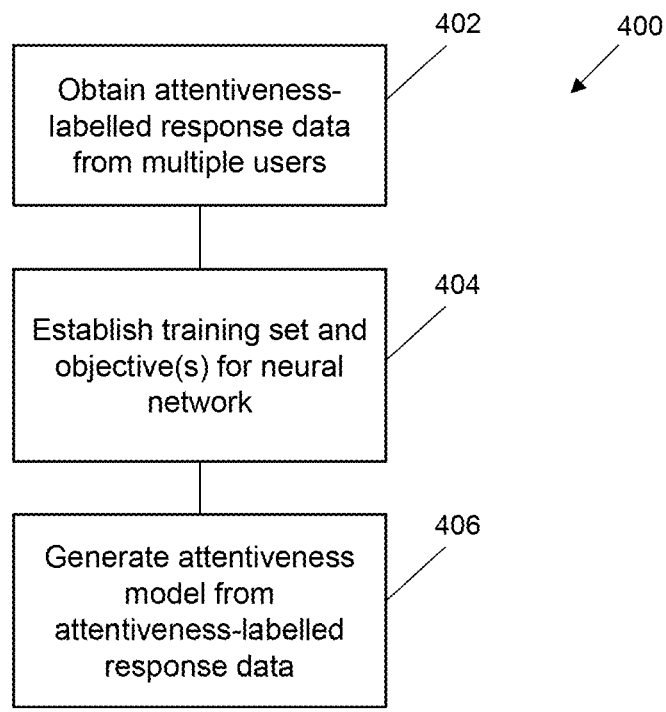
FIG. 4 is a flow diagram of a data analysis method that is an embodiment of the invention.

FIG. 4 is a flow diagram of a data analysis method 400 that utilises the attentiveness-labelled response data discussed above. The method begins with a step 402 of obtaining the attentiveness-labelled response data from a plurality of users. This may be done by the analysis server discussed above, which can stored attentiveness-labelled response data for multiple users in the storage device.

The method continues with a step 404 of establishing, from the obtained attentiveness-labelled response data, a training set and one or more objectives for an artificial neural network that is configured to supply an attentiveness score from collected data (in particular images of a user's reaction to media content).

Using the training set, the method continues with a step 406 of generating an attentiveness model. The attentiveness model may be used to score portions of collected data for attentiveness without requiring human interaction.

It can be understood from the discussion above that other data indicative of attentiveness may be used instead of the attentiveness-labelled response data as the target for the neural network. For example, attentiveness data used for model training may consist or comprise physiological data and media attentiveness saliency data.

Figure 5:
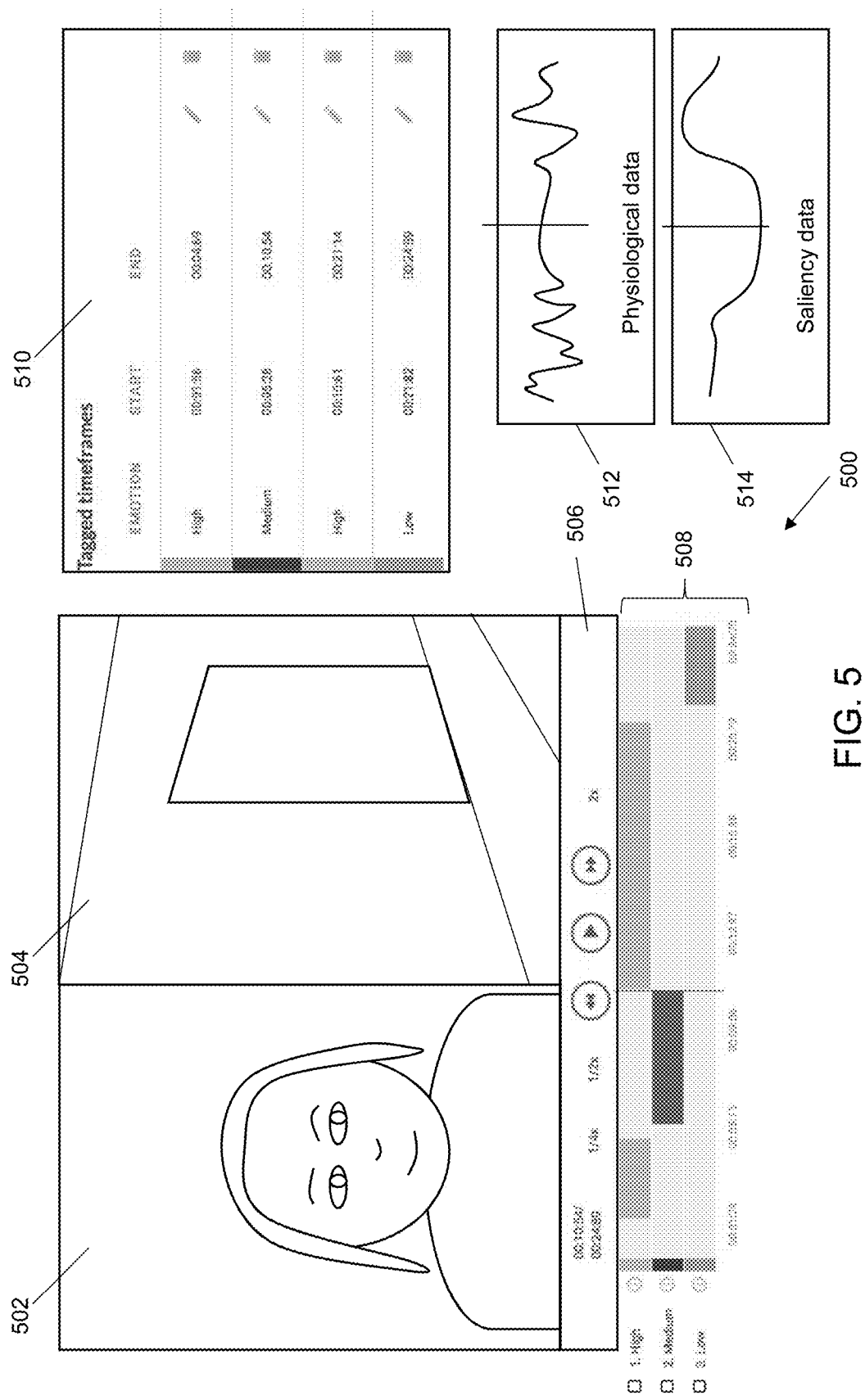
FIG. 5 is a schematic screen shot of an example annotation tool that may be used in embodiments of the invention.

FIG. 5 is a schematic screen shot of an example annotation tool 500 that may be used in embodiments of the invention. The annotation tool 500 is a graphical user interface that is displayable on the display screen of a computing device. It comprises a split-screen playback panel which is arranged to play the images of the user in a first portion 502 thereof and to display the media content being watched in a second portion 504 thereof. It can be understood from the discussion above that other collected information can also be displayed, e.g. relating to physiological data, etc. For example, information indicative of an intensity of a physiological response may be provided in a physiological data display panel 512, and information indicative of variation in media attentiveness saliency may be provided in a saliency data display panel 514. In another example, a previously trained attentiveness model may be used to automatically detect attentiveness and display data in the labelling tool, e.g. as a prompt to aid the annotation process.

Playback split-screen playback panel is controllable, e.g. via a control interface panel 506.

In this example, attentiveness scores are applied in a score applicator portion 508. This example allows application of one of three attention levels: high, medium or low, to portions of the response. A timeline for the response if provided for each attention level. A user can score a particular portion of the response in one of the attention levels by selecting or highlighting the timeline in that attention level for the appropriate duration. Where no attention level is selected for a portion of the response, it can be assumed that there is no attention, i.e. the user was absent or otherwise totally disengaged.

The annotator tool 500 further includes a summary panel 510 which lists the timeframes within the response that have been tagged with an attention level. The annotator may edit the summary panel 510 to affect the appearance of the score applicator portion 508.

It may be understood that the annotator tool depicted in FIG. 5 represents one of many ways in which tags may be applied to response data. The invention need not be limited to the arrangement shown in FIG. 5.

Figure 6:
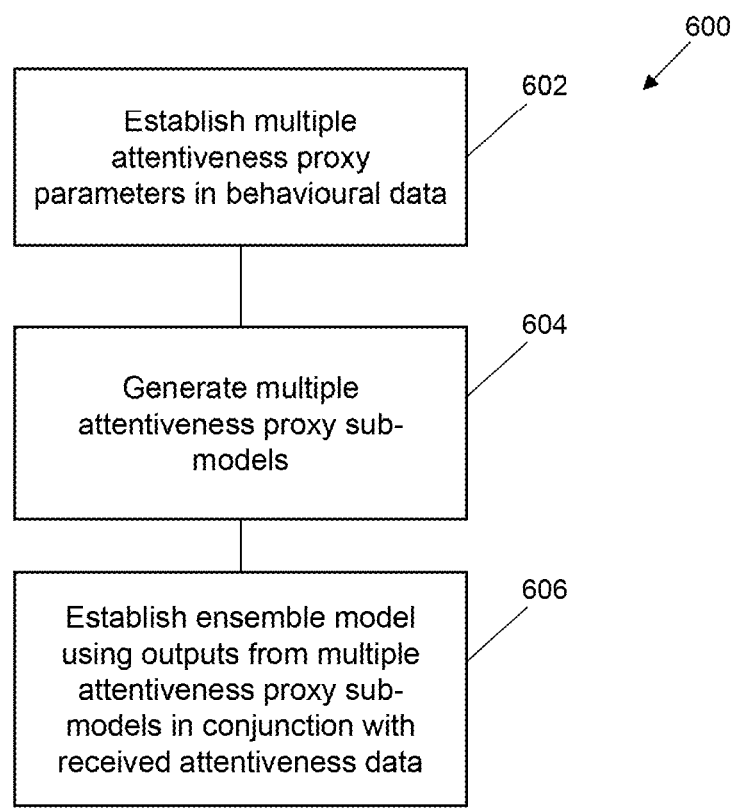
FIG. 6 is a flow diagram of a data analysis method that is another embodiment of the invention.

FIG. 6 is a flow diagram of a data analysis method 600 that utilises the attentiveness-labelled response data discussed above. The method begins with a step 602 of establishing multiple attentiveness proxy parameters. The proxy parameter represent features within the behavioural data that have been observed to correlate with attentiveness. These features may be established using data entered in the reasons field by each annotator. Example features may include head-pose, gaze direction, heightened emotion levels, blinks, facial expressivity, body gestures, heart rate, activities like eating or drinking, speaking, etc.

The method continues with a step 604 of generating an attentiveness proxy sub-model for each of the features identified in step 602. Unlike the attentiveness model discussed with reference to FIG. 4, each attentiveness proxy sub-model is established using a training set that comprises a subset of the attentiveness-labelled response data relating to its respective feature. Each attentiveness proxy sub-model is configured to supply an attentiveness score for input data representative of its respective feature.

The method continues with a step 606 of generating an attentiveness model that comprises an ensemble model that uses outputs from the plurality of attentiveness proxy sub-models as inputs. The ensemble model may be trained using the attentiveness data to apply appropriate weighting to the attentiveness proxy sub-model outputs.

The ensemble model can be used with new response data (i.e. response data without annotation) to supply an output indicative of attentiveness, together with a confidence score for that output. For example, the output indicative of attentiveness may be obtained from the plurality of attentiveness proxy sub-models, e.g. as an attentiveness score for different portions of the new response data obtaining by aggregating or averaging or otherwise processing the outputs from the attentiveness proxy sub-models. The attentiveness score may be a binary indication, i.e. indicating the presence or absence of user attention. In some examples, the proxy sub-models may provide only a positive or negative indication, i.e. only one of "attentive" or "not-attentive". The confidence score may be a numeric value that quantifies the confidence in the attentiveness score.

The invention claimed is:

1. A computer-implemented method of determining user attentiveness during media content consumption, the method comprising:
    obtaining, at a collection server, response data from a client device, wherein the response data is collected for a user consuming media content on the client device, and wherein the response data comprises a data stream representative of variation over time of the user's behaviour whilst consuming the media content;
    associating, at the collection server, the data stream with the media content;
    displaying, at an annotation device, a dynamic representation of the response data concurrently with the media content to which it is associated;
    receiving, at the annotation device, attentiveness data from an annotator, wherein the attentiveness data is an input score indicative of user attentiveness based on the dynamic representation;
    associating, at the annotation device, the attentiveness data with events in the data stream or media content to generate attentiveness-labelled response data;
    storing, in a data repository, attentiveness-labelled response data from multiple users;
    extracting, from the data repository by an analysis server, an attentiveness-labelled response data training set;
    establishing, at the analysis server, an objective for a machine learning algorithm; and
    generating, using the machine learning algorithm, an attentiveness model from the attentiveness-labelled response data training set.

2. The method of claim 1, wherein the data stream comprises information indicative of time evolution of one or more response data parameters.

3. The method of claim 1, wherein the response data comprises emotional state data obtained from facial image data of the user that is collected during consumption of the media content.

4. The method of claim 1 further comprising:
    obtaining, at the collection server, new response data from a client device, wherein the response data is collected for another user consuming media content on the client device, and wherein the response data comprises a data stream representative of variation over time of the user's behaviour whilst consuming the media content;
    inputting the new response data to the attentiveness model to obtain an attentiveness score for one or more portions of the new response data.

5. The method of claim 1, wherein extracting the attentiveness-labelled response data training set comprises applying a filter to the attentiveness-labelled response data in the repository.

6. The method of claim 1, wherein the attentiveness-labelled response data in the training set comprises media tag data indicative of subject matter in the media content being consumed, and wherein the method further comprises:
    obtaining new media tag data for another piece of media content, and
    inputting the new media tag data to the attentiveness model to obtain an attractiveness score for one or more portions of the piece of media content.

7. The method of claim 1, wherein associating the data stream with the media content comprises synchronising the response data with the media content.

8. The method of claim 7, wherein the response data is time stamped, and wherein synchronising the response data with the media content comprising matching time stamp data with media playback status data.

9. The method of claim 1, wherein the data stream further comprises any of:
    media control data,
    media tag data,
    media attentiveness saliency data, and
    media playback status data.

10. The method of claim 1, wherein generating the attentiveness-labelled response data comprises adding an attentiveness label parameter to the response data.

11. The method of claim 1, wherein the attentiveness data is selected from any one of:
    a binary indicator,
    a plurality of preset levels, and
    a sliding scale.

12. The method of claim 1, wherein the response data comprises emotional state data, and wherein the method further comprises deriving a significance score or weighting for the emotion state data based on the received attentiveness data.

13. The method of claim 1 including controlling the concurrently displayed dynamic representation of the response data and the media content to which it is associated.

14. The method of claim 1 further comprising:
receiving, at an analysis server, attentiveness data relating to the dynamic representation from a plurality of annotators;
generating, by the analysis server, combined attentiveness data for the dynamic representation, the combined attentiveness data comprising an attentiveness parameter that is indicative of level of positive correlation between the attentiveness data from the plurality of annotators.

15. The method of claim 14, wherein the input score for the attentiveness data is a binary indicator and the attentiveness parameter is a continuous variable.

16. The method of claim 1 further comprising:
storing, in a data repository, attentiveness-labelled response data from multiple users;
generating, using the attentiveness-labelled response data, a plurality of attentiveness proxy sub-models, wherein each of the attentiveness proxy sub-models is trained based on a respective attentiveness proxy parameter to supply an output indicative of attentiveness from the response data; and
establishing an ensemble model that uses outputs from the plurality of attentiveness proxy sub-models to supply an attentiveness confidence score.

17. The method of claim 16 further comprising:
obtaining, at the collection server, new response data from a client device, wherein the response data is collected for another user consuming media content on the client device, and wherein the response data comprises a data stream representative of variation over time of the user's behaviour whilst consuming the media content;
inputting the new response data to the plurality of attentiveness proxy sub-models to obtain an attentiveness score for one or more portions of the new response data; and
inputting the outputs of the plurality of attentiveness proxy sub-models to the ensemble model to obtain an attentiveness confidence score associated with the attentiveness score.

18. A computer-implemented method of determining user attentiveness during media content consumption, the method comprising:
obtaining, at a collection server, response data from a client device, wherein the response data is collected for a user consuming media content on the client device, and wherein the response data comprises a data stream representative of variation over time of the user's behaviour whilst consuming the media content;
associating, at the collection server, the data stream with the media content;
displaying, at a plurality of annotation devices, a dynamic representation of the response data;
receiving, at the plurality of annotation devices, attentiveness data from an annotator, wherein the attentiveness data is an input score indicative of user attentiveness based on the dynamic representation;
receiving, at an analysis server from the plurality of annotation devices, attentiveness data relating to the dynamic representation from a plurality of annotators;
generating, by the analysis server, combined attentiveness data for the dynamic representation, the combined attentiveness data comprising an attentiveness parameter that is indicative of level of positive correlation between the attentiveness data from the plurality of annotators;
associating, at the analysis server, the combined attentiveness data with events in the data stream or media content to generate attentiveness-labelled response data;
storing, in a data repository, attentiveness-labelled response data from multiple users;
extracting, from the data repository by the analysis server, an attentiveness-labelled response data training set;
establishing, at the analysis server, an objective for a machine learning algorithm; and
generating, using the machine learning algorithm, an attentiveness model from the attentiveness-labelled response data training set.

19. A system for determining user attentiveness during media content consumption, the system comprising:
a collection server communicatively coupled via a network to a plurality of client devices, the collection server being configured to:
obtain response data from the plurality of client devices, wherein the response data is collected for a user consuming media content on the client device, and wherein the response data comprises a data stream representative of variation over time of the user's behaviour whilst consuming the media content; and
associate the data stream to the media content;
an annotation device communicatively coupled to the collection server, the annotation device being configured to:
display a dynamic representation of the response data concurrently with the media content to which it is associated;
receive attentiveness data that comprises an input score indicative of user attentiveness based on the dynamic representation; and
associate the attentiveness data with events in the data stream or media content to generate attentiveness-labelled response data;
a data repository configured to store attentiveness-labelled response data from multiple users; and
an analysis server communicatively coupled to the data repository, the analysis server being configured to:
extract, from the data repository, an attentiveness-labelled response data training set;
establish an objective for a machine learning algorithm; and
generate, using the machine learning algorithm, an attentiveness model from the attentiveness-labelled response data training set.

* * * * *